United States Patent [19]

Hoska

[11] Patent Number: 5,029,716

[45] Date of Patent: Jul. 9, 1991

[54] TAPE CASSETTE STORAGE SYSTEM

[76] Inventor: Gerald R. Hoska, 7008 W. 84th St., Bloomington, Minn. 55438

[21] Appl. No.: 355,672

[22] Filed: May 23, 1989

[51] Int. Cl.$^5$ .............................................. B65D 85/00
[52] U.S. Cl. ........................................ 211/94; 211/41; 211/71; 248/214; 248/221.4; 206/387
[58] Field of Search .................. 248/214, 221.4, 223.4, 248/309.1, 311.2, 314, 225.1; 211/94, 40, 41, 71; 206/387

[56] References Cited

U.S. PATENT DOCUMENTS

| | | |
|---|---|---|
| 1,781,991 | 11/1930 | Stover . |
| 1,930,965 | 10/1933 | Christy . |
| 2,804,212 | 8/1957 | Spitzig . |
| 3,272,325 | 9/1966 | Schoenmakers . |
| 3,396,840 | 8/1968 | Farren . |
| 3,425,568 | 2/1969 | Albright . |
| 3,452,878 | 7/1969 | Smith . |
| 3,495,716 | 2/1970 | Gregory . |
| 3,574,964 | 4/1971 | Ownbey ........................ 248/221.4 |
| 3,622,012 | 11/1971 | Lundgren . |
| 3,696,935 | 10/1972 | Dean . |
| 3,717,258 | 2/1973 | McKinnon . |
| 3,746,180 | 7/1973 | Spiroch . |
| 3,897,885 | 8/1975 | Joyce . |
| 3,909,088 | 9/1975 | Dennehey . |
| 3,977,523 | 8/1976 | Cousino . |
| 4,094,415 | 6/1978 | Larson . |
| 4,133,507 | 1/1979 | Chervenak . |
| 4,155,459 | 5/1979 | Marschak . |
| 4,177,896 | 12/1979 | Weavers . |
| 4,194,636 | 3/1980 | Byram . |
| 4,203,519 | 5/1980 | Fujitaki ........................... 206/387 |
| 4,300,692 | 11/1981 | Moreno . |
| 4,308,961 | 1/1982 | Kunce . |
| 4,311,295 | 1/1982 | Jamar, Jr. . |
| 4,327,952 | 5/1982 | Cournoyer . |
| 4,329,003 | 5/1982 | Manchester . |
| 4,333,568 | 6/1982 | Weldin . |
| 4,368,934 | 1/1983 | Somers . |
| 4,401,222 | 8/1983 | Kulikowski . |
| 4,457,436 | 7/1984 | Kelley . |
| 4,573,589 | 3/1986 | Atkinson . |
| 4,584,950 | 4/1986 | Adams . |
| 4,648,514 | 3/1987 | Niles . |
| 4,711,419 | 12/1987 | Polosky . |
| 4,730,735 | 3/1988 | Lechner . |

FOREIGN PATENT DOCUMENTS

| | | |
|---|---|---|
| 2433570 | 1/1976 | Fed. Rep. of Germany . |
| 623231 | 4/1963 | France . |
| 357706 | 12/1961 | Switzerland . |
| 2013080 | 8/1979 | United Kingdom . |
| 2135657 | 9/1984 | United Kingdom ................ 206/287 |

*Primary Examiner*—Ramon O. Ramirez
*Assistant Examiner*—Robert A. Olson
*Attorney, Agent, or Firm*—Haugen and Nikolai

[57] ABSTRACT

An improved system for storing tape cassettes which includes, in combination, a tape cassette hanger means along with a rail support cooperating with the hanger means. The hanger means is arranged to be removably attached to the rail support, and includes a pair of rail groove-engaging hook members which extend outwardly from a backing, with the upper hook member having an outer tip of generally arcuate downwardly converging configuration, and with the lower groove-engaging hook member being of generally linear configuration with a horizontally projecting first segment extending outwardly from the base and having a rail groove-engaging flange at the outer tip thereof.

1 Claim, 4 Drawing Sheets

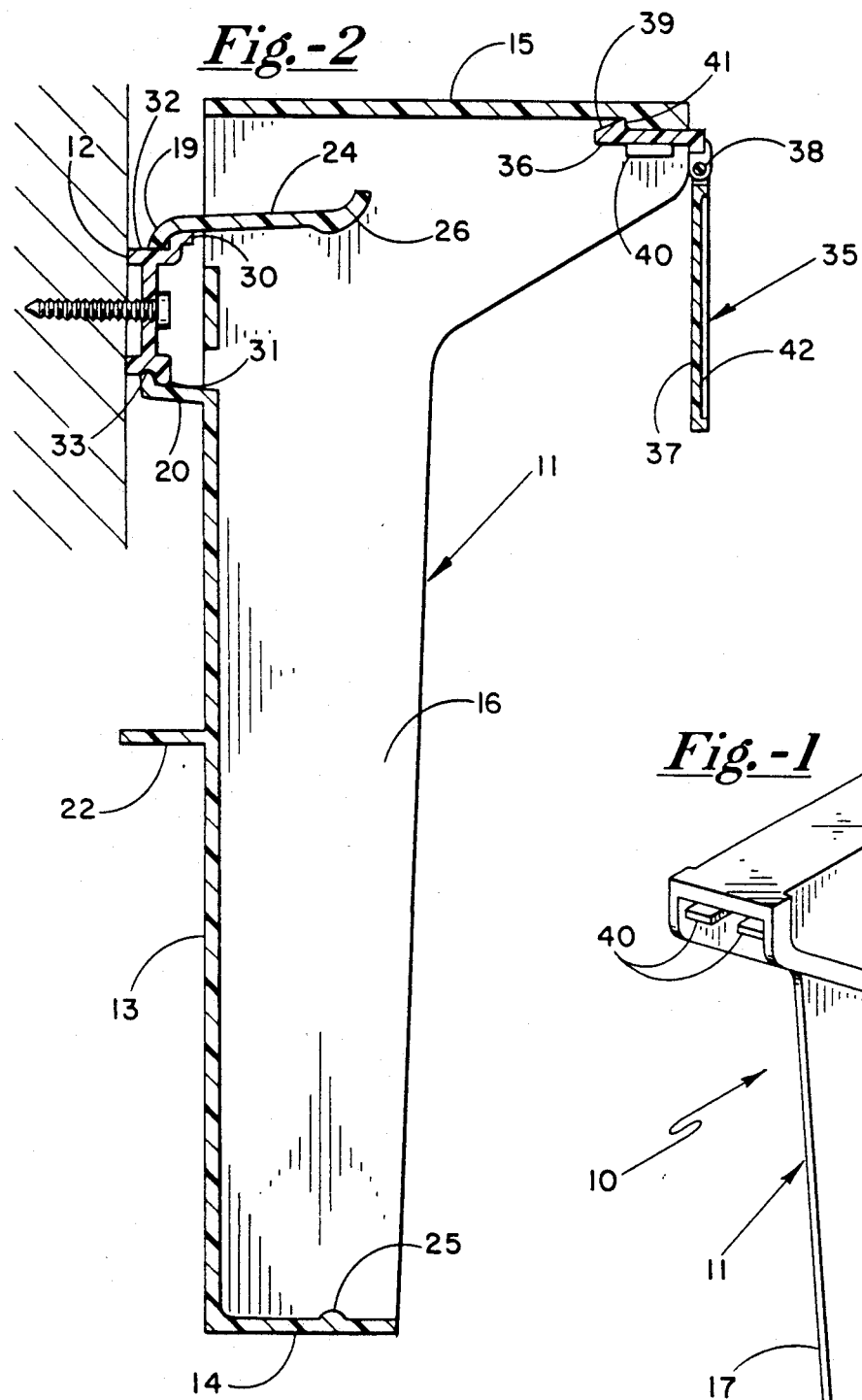
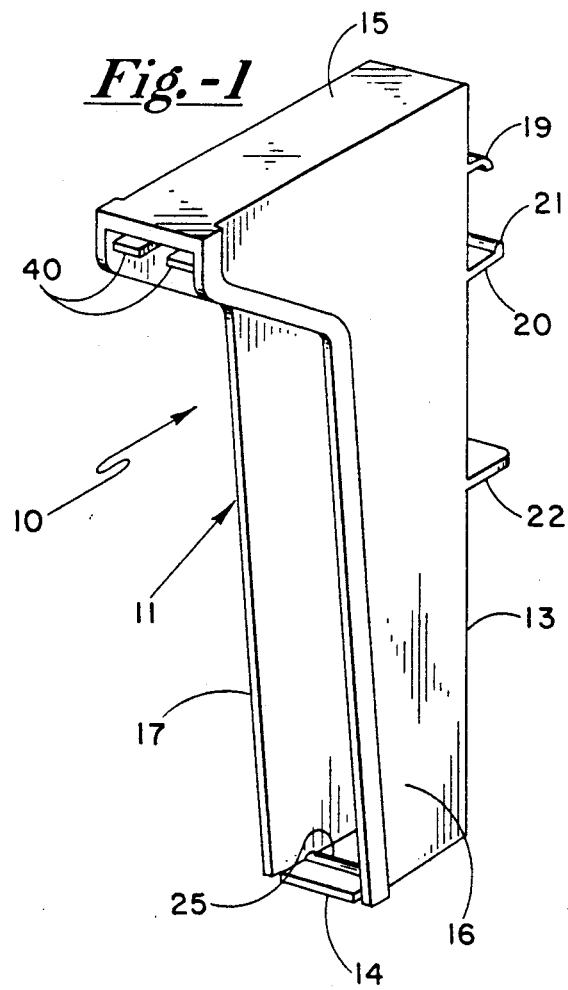

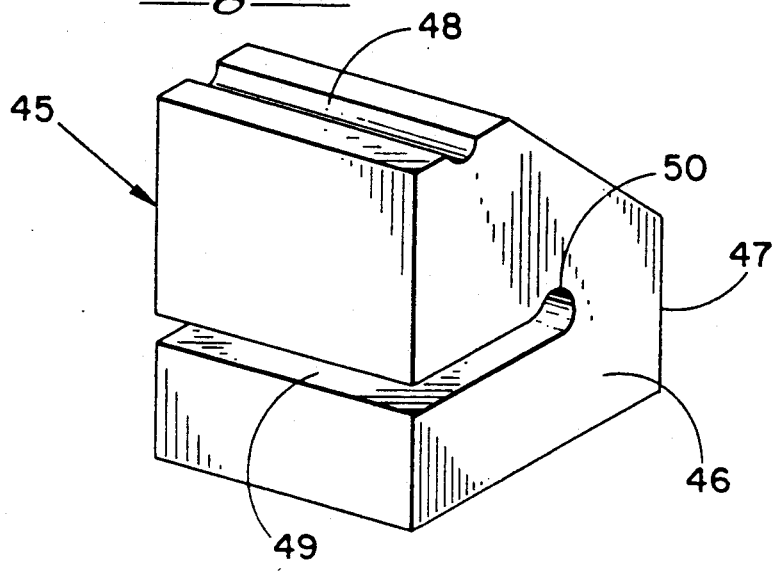
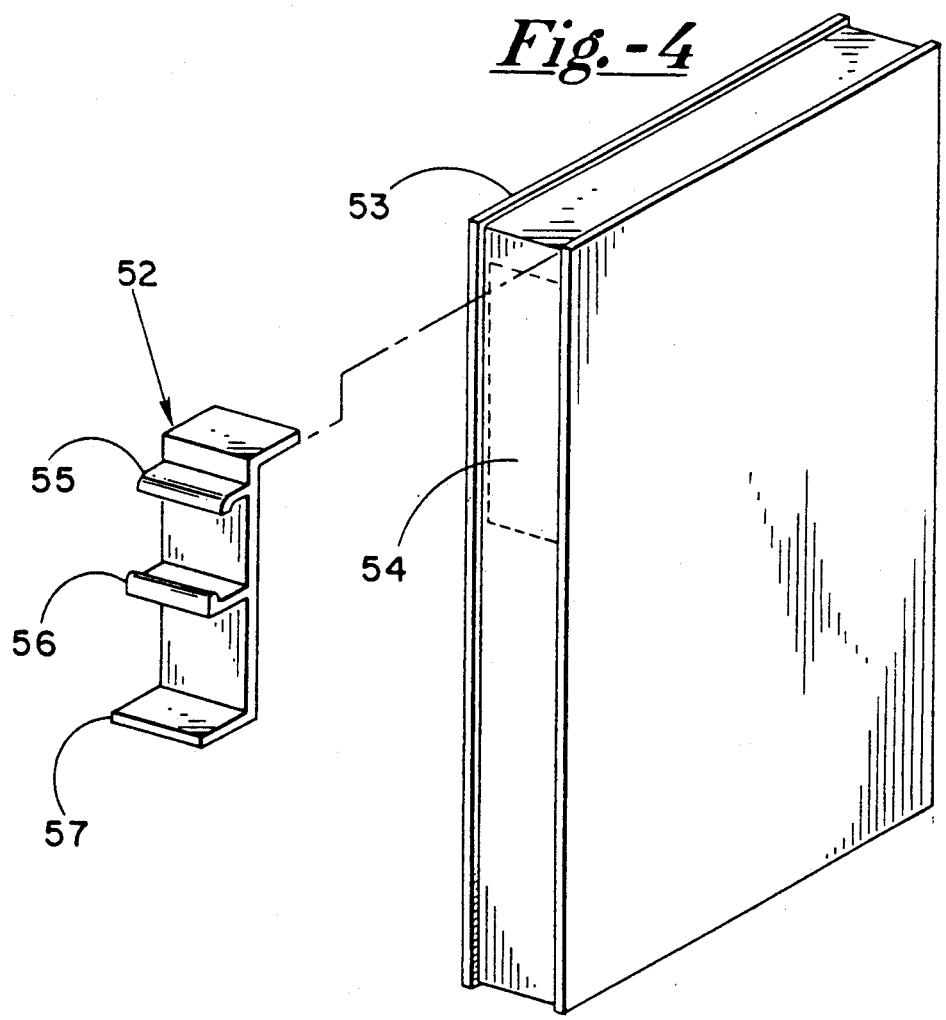

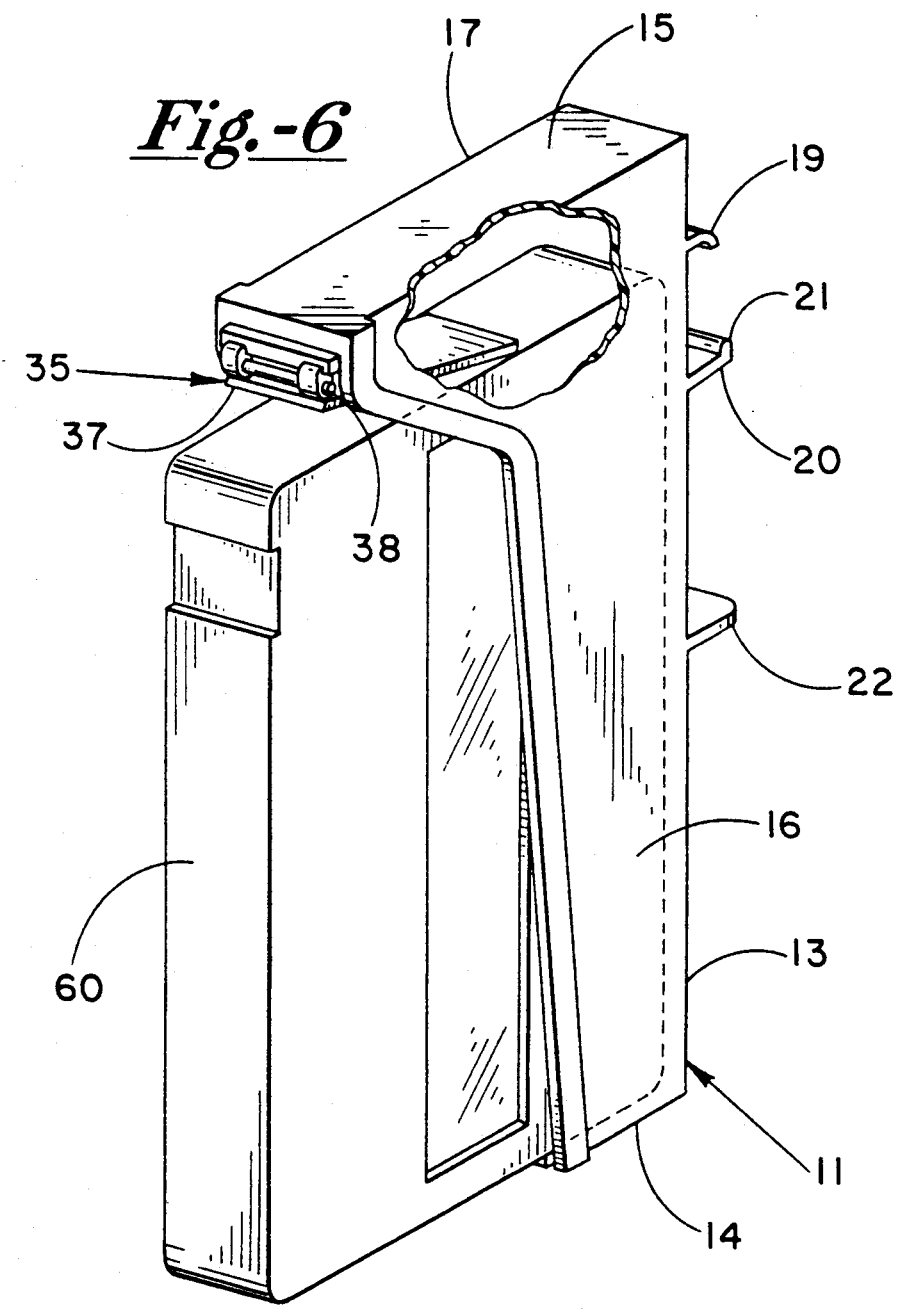

TAPE CASSETTE STORAGE SYSTEM

BACKGROUND OF THE INVENTION

The present invention relates generally to an improved receptacle means for storing tape cassettes, and more specifically to a combination tape cassette receiving and storage system which includes a tape cassette hanger means along with a rail support cooperating with the hanger means. The combination of the present invention provides a safe and effective cassette storage system, and with a feature of one embodiment including a tape-identifying tag which drops into view when the tape is removed for accommodating expeditious and accurate replacement of the tape cassette to its assigned location following removal from the storage system for remote use.

The increasing availability of data and information systems has created a need for recording and storing such data and information. Tape cassettes are widely used as a means for retaining information on a substantially permanent basis, and are available in a number of formats including VHS and Beta formats, among others. As the quantity of such recorded information increases, the need as well as the means for storing quantities of tape cassettes correspondingly increases. Various techniques have been made available for storing such cassettes, including wall panel systems as well as rail storage systems. Since such storage space is normally limited in quantity, efficient means of storing such tapes in a readily accessible fashion is, of course, increasingly desirable.

As tape storage systems become more compact, it becomes increasingly important to provide a means for identifying the location of tapes removed from the system. In accordance with one feature of an embodiment of the present invention, a hanging tag is provided which is disposed in relatively concealed position while the cassette tape is in place, but which falls into prominent view when the tape is removed from its stored position. Thus, when the cassette tape is in place, its own identifying indicia may be utilized to locate the desired tape, but once removed, the identifying tag will become visible in order to expedite and facilitate its proper return.

SUMMARY OF THE INVENTION

The tape cassette receiving and storage system of the present invention includes, in combination, a hanger means having attachment means arranged to be coupled to a cassette and to be supported thereby, along with a wall-mounted rail support to which the hanger means may be releasably coupled. The rail support is arranged to be mounted horizontally on a wall or other support surface, and when in such position, cooperates with the hanger means to provide a support for the tape cassette. The rail support has formed therein a pair of spaced-apart grooves which firmly and releasably receive the hanger means for firm storage and relative ease of removal. In one embodiment of the present invention, the hanger means is arranged integrally with a cassette receiving enclosure, and with one wall of the enclosure being provided with the hanger means for ready attachment to the horizontally disposed rail support.

Therefore, it is a primary object of the present invention to provide an improved tape cassette receiving and storage system which includes, in combination, a hanger means arranged for attachment to a cassette to be supported thereon, along with a horizontally disposed rail support which cooperates with the hanger means and facilitates ease of receiving and removing the tape cassette to and from its stored position.

It is yet a further object of the present invention to provide an improved tape cassette receiving and storage system which provides a means for securely storing tape cassettes in releasable position on a horizontally disposed wall mounted rail support, and wherein individual tape cassettes may be easily and readily removed from the stored disposition when needed for use.

Other and further objects of the present invention will become apparent to those skilled in the art upon a study of the following specification, appended claims, and accompanying drawings.

BRIEF DESCRIPTION OF THE DRAWINGS

FIG. 1 is a perspective view of a cassette tape receiving enclosure utilized in the combination of the present invention, with the receiving enclosure of FIG. 1 having the tape-identifying hanging tag removed therefrom;

FIG. 2 is a vertical sectional view of the cassette tape receiving enclosure illustrated in FIG. 1, and further illustrating the hanging tag component in its disposition following removal of the tape cassette therefrom and further illustrating, in section, the horizontally disposed rail support component of the combination;

FIG. 3 is a detailed perspective view of a modified form of rail support adapted for use in connection with the combination of the present invention;

FIG. 4 is a perspective view of a generally rectangular hanger element, with this hanger element forming an alternative embodiment of the present invention wherein the enclosure receptacle of FIGS. 1-3 is not employed, and further showing, in perspective view, a typical tape cassette upon which the hanger element is adhesively secured;

FIG. 6 is a perspective view of the elements illustrated in FIG. 5, but further illustrating the tape cassette in its stored position within the cassette receiving enclosure.

DESCRIPTION OF THE PREFERRED EMBODIMENT

Figure 5:
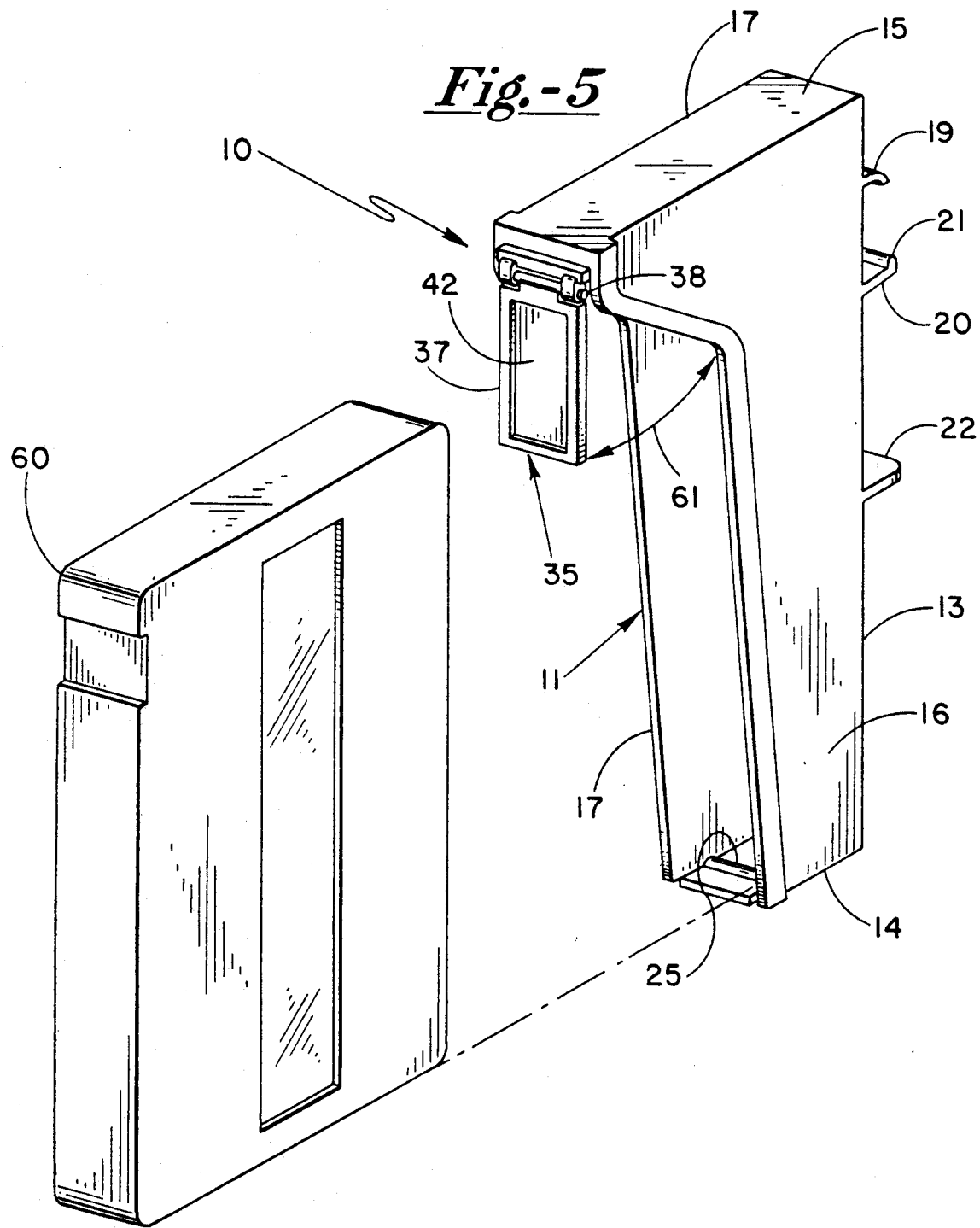
FIG. 5 is a perspective view of a typical tape cassette along with a cassette receiving enclosure of the present invention, with the cassette enclosure of FIG. 5 being similar to that illustrated in FIGS. 1-3 herein.

In accordance with the preferred embodiment of the present invention, and with particular attention being directed to FIGS. 1-3 of the drawings, the tape cassette receiving and storage means generally designated 10 comprises a hanger means in the form of a cassette receiving enclosure 11 adapted to be releasably secured to a horizontally disposed wall-mounted rail support member 12. The cassette receiving enclosure 11 has a bottom wall 13, a pair of opposed end walls 14 and 15, along with side walls 16 and 17. This receptacle, when formed in this fashion, is provided with an open front or top thus facilitating ease of receiving a typical tape cassette therewithin.

As is apparent from the structures illustrated in FIGS. 1 and 2, the hanger means is integral with and forms a portion of the bottom wall 13 of enclosure 11. The hanger means in this embodiment includes a pair of outwardly extending rail groove-engaging hook members including an upper hook member 19 and a lower groove-engaging hook member 20. The upper hook member 19 is of generally arcuate and downwardly converging configuration so as to appropriately engage the profile of rail 12, as illustrated in FIG. 2, and with the tip of the hook engaging a groove or recess area formed in the wall-mounted rail. Lower groove-engaging hook member 20 is of generally linear configuration with an upwardly projecting flanged segment 21 extending outwardly from the backing member and in upwardly converging relationship. The tip of upwardly extending or projecting flange segment 21 is designed to rest in a groove formed in the rail support member.

Also, and if desired, a second horizontally projecting member 22 may be provided along the bottom wall 13, as illustrated at 22. Member 22 aids in maintaining vertical disposition of cassette receiving enclosure 11 when in stored position.

With continued attention being directed to FIG. 2 of the drawings, enclosure 11 is provided with a laterally extending cassette-engaging pressure-applying claw 24 therewithin. Camming surface 24 is arranged as an inwardly extending projection of upper groove-engaging hook member 19. A half-round projection 25 is arranged at the opposed end of receptacle 11, such as on the inner surface of end wall 14. Projection 25 along with cooperating half-round projection 26 engages the exterior of conventional commercially available tape cassettes. In this arrangement, therefore, the arrangement is such that the inwardly extending projection 24 flexes resiliently outwardly in response to forces created when a cassette is either introduced within or removed from the cassette receiving enclosure, thus applying a retaining force within the receptacle for assuring firm lodgment of the tape cassette within the enclosure.

Attention is now directed to FIG. 2 of the drawings wherein the detail of one useful horizontally disposed rail support member of the combination is illustrated. Rail 12 is provided with an upper half-round projection as at 30, along with a lower half-round projection as at 31. Recesses are available behind the projections, such as in the upper recess areas as at 32, and the lower recess area as at 33. These recesses permit the distal tip portions of hook members 19 and 20 to lockingly but releasably engage the rail support. In this connection, therefore, the user may initially engage either upper member 19 or lower member 20 with the recess, and thereafter arcuately rotate and position the cassette receiving enclosure in locked position on rail 12. The distance between tips of hook members 19 and 20 is such that flexure of these members must occur in order for locking engagement with the rail to be accomplished. In other words, the distance between the outwardly positioned tips of members 19 and 20 is less than the distance separating the depth of recesses or grooves 32 and 33.

With continued attention being directed to FIGS. 1 and 2 of the drawings, hanging tag generally designated 35 is shown in the position it assumes upon removal of the tape cassette from enclosure 11. Tag 35 includes a tine 36, along with an indicia-receiving panel 37. Panel 37 is pivotally secured to tine 36 by means of pivot pin 38. For appropriately engaging tine 36 with enclosure 11, tine 36 along with its wedge-shaped head 39 is pressed inwardly between guides 40—40, and when extended beyond the inner edge of members 40, wedge-shaped member 39 becomes lockably secured against removal by engaging shoulder 41 on the inner surface of top wall 15. Written indicia is placed upon panel 37, particularly as at 42.

Attention is now directed to FIG. 3 of the drawings wherein a modified form of rail support is illustrated generally as at 45. Rail support 45 includes a body 46 for attachment to a wall surface as at and along end 47, with a pair of grooves being formed therein as at 48 and 49. The inner end of groove 49 terminates in a half-round zone as at 50 for engaging lower hook member 21 of member 20.

Attention is now directed to FIG. 4 of the drawings for a view of an alternative embodiment. Hanger means generally designated 52 are arranged to be adhesively secured to tape cassette case 53 as at and along adhesive bonding panel 54. When secured in place, hanger means 52 may be appropriately mounted upon rail 12 in the manner illustrated hereinabove with respect to the preferred embodiment. Hanger means 52 includes upper and lower opposed rail groove-engaging hook members 55 and 56 respectively, with the configuration and function of members 55 and 56 being the same as that illustrated in the embodiment of FIGS. 1 and 2 hereinabove. Alternatively, projection 57 may be provided in order to control the degree of arcuate pivotal motion of hanger means 52 relative to its horizontally disposed rail support member cooperating therewith. Additionally, an upper flange or bracket member 58 may be provided in order to add additional support to the contact areas existing between hanger means 52 and tape cassette case 53.

Attention is now directed to FIGS. 5 and 6 of the drawings wherein the movement of a typical tape cassette is shown. In this arrangement, tape cassette generally designated 60 is disposed outwardly of receiving enclosure 11, and with indicia-receiving panel 37 shown in suspended form. Upon introduction of cassette 60 into enclosure 11, panel 37 will pivot inwardly of enclosure 11 along the inward portion of double-headed arrow 61. The arrangement illustrated in FIG. 6 shows cassette 60 in its stored position within receiving enclosure 11.

It will be appreciated, therefore, that the combination of the present invention provides an improved tape cassette receiving and storage system adapted for ease of safe and effective storage and removal of tape cassettes. The cassette receiving and storage system combination of the present invention provides a further desirable means of identifying locations for tapes once removed from the stored disposition.

Other and further embodiments of the present invention will become apparent to those skilled in the art upon a study of the foregoing specification and appended claims without departing from the spirit and scope of the present invention.

What is claimed is:

1. A tape cassette receiving and storage system having an open top and including a bottom wall, a pair of opposed end walls and a pair of opposed side walls, comprising, in combination:

(a) hanger means having attachment means arranged to be coupled to a cassette to be supported thereby, with said hanger means being adapted to be releasably coupled to a rail support, and a horizontally disposed rail support cooperating with said hanger means and having a pair of spaced apart grooves formed therein and integral therewith for firmly and releasably receiving said hanger means therewithin; the arranging being characterized in that:

(1) said hanger means comprising a generally rectangular backing member having upper and lower opposed rail groove-engaging hook members extending outwardly therefrom, said upper groove-engaging hook member being of generally arcuate downwardly converging configuration and with the lower groove-engaging hook member being of generally linear configuration with a horizontally projecting first segment extending outwardly from said rectangular backing member and having a groove-engaging flange at the outer tip thereof, said groove-engaging flange extending vertically upwardly from said horizontally projecting first segment;

(2) said hanger means being integral with and forming a portion of a cassette receiving enclosure wherein said rectangular backing member forms at least a portion of said bottom wall; and (3) said upper groove-engaging hook of said attachment means having an integral projection extending inwardly of said cassette receiving enclosure adjacent a first of opposed end walls thereof with said projection having an arcuate laterally extending pressure-applying cassette engaging camming surface which is resiliently biased through flexure toward the end wall opposed to said first end wall, the arrangement being such that said inwardly extending projection flexes resiliently outwardly in response to forces created when a cassette is introduced into or removed from said cassette receiving enclosure while making contact with said cassette camming surface, and is arranged to lockingly engage a cassette when fully inserted into said cassette receiving enclosure.

* * * * *